US010807206B2

(12) United States Patent
Fukuda et al.

(10) Patent No.: US 10,807,206 B2
(45) Date of Patent: Oct. 20, 2020

(54) MEASURING APPARATUS AND SUPPORT MECHANISM OF COLUMNAR WORK PIECE

(71) Applicant: MITUTOYO CORPORATION, Kanagawa (JP)

(72) Inventors: Mitsuru Fukuda, Tochigi (JP); Noritsugu Ono, Tochigi (JP); Hirotada Anzai, Schaumburg, IL (US)

(73) Assignee: MITUTOYO CORPORATION, Kanagawa (JP)

( * ) Notice: Subject to any disclaimer, the term of this patent is extended or adjusted under 35 U.S.C. 154(b) by 426 days.

(21) Appl. No.: 15/590,283

(22) Filed: May 9, 2017

(65) Prior Publication Data

US 2017/0341192 A1 Nov. 30, 2017

(30) Foreign Application Priority Data

May 24, 2016 (JP) ................. 2016-103112

(51) Int. Cl.
*B23Q 3/00* (2006.01)
*G01B 5/008* (2006.01)
*B23Q 3/06* (2006.01)
*G01B 21/02* (2006.01)
*G01B 21/04* (2006.01)

(52) U.S. Cl.
CPC ............. *B23Q 3/007* (2013.01); *B23Q 3/002* (2013.01); *B23Q 3/064* (2013.01); *G01B 5/008* (2013.01); *B23Q 3/005* (2013.01); *G01B 21/02* (2013.01); *G01B 21/047* (2013.01)

(58) Field of Classification Search
CPC ........ B23Q 3/002; B23Q 3/005; B23Q 3/007; B23Q 3/064; G01B 5/008; G01B 21/02; G01B 5/002
USPC ........................................... 227/83
See application file for complete search history.

(56) References Cited

U.S. PATENT DOCUMENTS 3,367,612 A * 2/1968 Usiskin ............... G01B 5/0004
248/124.1
3,749,500 A * 7/1973 Carlson ............. G01B 11/2433
356/638

(Continued)

FOREIGN PATENT DOCUMENTS

JP 2015-081878 A 4/2015

*Primary Examiner* — Anna K Kinsaul
*Assistant Examiner* — Daniel Jeremy Leeds
(74) *Attorney, Agent, or Firm* — Greenblum & Bernstein, P.L.C.

(57) ABSTRACT

Measuring apparatus includes an upper support supporting a first end of a columnar work piece in an axis direction, a lower support supporting a second end of the work piece in the axis direction, a probe measuring the work piece supported by the upper support and lower support, a rotary table coupled to the lower support and capable of rotating centered in the axis direction, and a post provided to the rotary table and mounting a first position determiner and a second position determiner so as to be switchable, the first and second position determiner determining a position of the work piece with respect to the rotary table. When a first columnar work piece as the work piece is supported by the upper support and lower support, the first position determiner is mounted to the post to determine a position by contacting the first work piece.

10 Claims, 9 Drawing Sheets

(56) References Cited

U.S. PATENT DOCUMENTS

| | | | | |
|---|---|---|---|---|
| 4,251,922 | A * | 2/1981 | Perlotto | B23Q 17/2225 |
| | | | | 33/1 M |
| 4,809,441 | A * | 3/1989 | Mann | G01B 5/242 |
| | | | | 33/536 |
| 5,052,089 | A * | 10/1991 | Gadaud | B23B 3/162 |
| | | | | 29/27 R |
| 5,193,286 | A * | 3/1993 | Collier | G01B 5/0002 |
| | | | | 33/1 M |
| 5,711,198 | A * | 1/1998 | Rice | B23K 37/0533 |
| | | | | 269/306 |
| 6,105,396 | A * | 8/2000 | Glodis | C03B 37/01211 |
| | | | | 65/377 |
| 7,191,540 | B1 * | 3/2007 | Brewer | G01B 5/0004 |
| | | | | 33/503 |
| 8,584,372 | B2 * | 11/2013 | Stoffel | G01B 3/20 |
| | | | | 33/628 |
| 2002/0194967 | A1 * | 12/2002 | Prust | B23Q 7/047 |
| | | | | 82/120 |
| 2006/0191149 | A1 * | 8/2006 | Banks | G01B 5/008 |
| | | | | 33/502 |
| 2013/0300861 | A1 * | 11/2013 | Neumann | G01B 5/012 |
| | | | | 348/135 |
| 2014/0130363 | A1 * | 5/2014 | Hagino | G01B 5/0004 |
| | | | | 33/503 |
| 2015/0292852 | A1 * | 10/2015 | Oki | G01B 5/008 |
| | | | | 33/502 |
| 2016/0258734 | A1 | 9/2016 | Anzai et al. | |

* cited by examiner

MEASURING APPARATUS AND SUPPORT MECHANISM OF COLUMNAR WORK PIECE

CROSS-REFERENCE TO RELATED APPLICATIONS

The present application claims priority under 35 U.S.C. § 119 of Japanese Application No. 2016-103112, filed on May 24, 2016, the disclosure of which is expressly incorporated by reference herein in its entirety.

BACKGROUND OF THE INVENTION

1. Field of the Invention

The present invention relates to a measuring apparatus measuring a columnar work piece and a columnar work piece support mechanism supporting the columnar work piece.

2. Description of Related Art

Measuring apparatuses measuring a shape of an elongated, columnar work piece are known. For example, a measuring apparatus is disclosed in Japanese Patent Laid-open Publication No. 2015-81878 A, which measures a shape of a columnar work piece such as a crank shaft. The measuring apparatus supports a top end portion of the columnar work piece and also supports a bottom end portion of the columnar work piece by a rotary table. Further, in the measuring apparatus, as a positioning determiner determining a position of columnar work piece with respect to the rotary table, a rotation stopper is coupled to the rotary table to prevent rotation of the columnar work piece with respect to the rotary table.

There has been a request in recent years to enable columnar work pieces having different shapes (such as the crank shaft or a cam shaft) to be measured using a single measuring apparatus. However, the measuring apparatus described in Japanese Patent Laid-open Publication No. 2015-81878 is configured to measure crank shafts but not columnar work pieces other than crank shafts. In particular, when columnar work pieces have different shapes, the position with respect to the rotary table cannot be determined using the same position determiner.

SUMMARY OF THE INVENTION

In view of the above, the present invention seeks to provide a measuring apparatus capable of readily determining positions of a plurality of columnar work pieces having different shapes using the same measuring apparatus.

In one aspect of the present invention, the measuring apparatus includes a first end support portion supporting a first end of a columnar work piece in an axis direction, a second end support portion supporting a second end of the columnar work piece in the axis direction, a probe measuring the columnar work piece supported by the first end support portion and the second end support portion, a rotary table coupled to the second end support portion and capable of rotating centered on the axis direction, and a mounting portion provided to the rotary table and mounting a first position determiner and a second position determiner so as to be switchable, the first and second position determiners determining a position of the columnar work piece with respect to the rotary table. In the measuring apparatus, when a first columnar work piece as the columnar work piece is supported by the first end support portion and the second end support portion, the first position determiner is mounted to the mounting portion to determine the position by contacting the first columnar work piece, and when a second columnar work piece having the different shape from the first columnar work piece as the columnar work piece is supported by the first end support portion and the second end support portion, the second position determiner is mounted to the mounting portion to determine the position by contacting the second columnar work piece.

In addition, in the first position determiner and the second position determiner, an operator may be provided to operate attachment/detachment with respect to the mounting portion.

Further, the operator may have a shaft member engaging with a hole provided to the mounting portion.

Furthermore, a grip may be provided to the first position determiner and the second position determiner.

In addition, the grip may be respectively provided on both side surfaces of the first position determiner and the second position determiner and two operators may be provided on central areas of the first position determiner and the second position determiner.

In another aspect of the present invention, a support mechanism of a columnar work piece includes a first end support portion supporting a first end of the columnar work piece in an axis direction, a second end support portion supporting a second end of the columnar work piece in the axis direction, a rotary table coupled to the second end support portion and capable of rotating centered on the axis direction, and a mounting portion provided to the rotary table and mounting a first position determiner and a second position determiner so as to be switchable, the first and second position determiners determining a position of the columnar work piece with respect to the rotary table. In the support mechanism of the columnar work piece, when a first columnar work piece as the columnar work piece is supported by the first end support portion and the second end support portion, the first position determiner is mounted to the mounting portion to determine the position by contacting the first columnar work piece, and when a second columnar work piece having the different shape from the first columnar work piece as the columnar work piece is supported by the first end support portion and the second end portion support portion, the second position determiner is mounted to the mounting portion to determine the position by contacting the second columnar work piece.

The present invention provide effects to readily determine positions of the plurality of columnar work pieces having the different shapes using the same apparatus.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Measuring Apparatus

Figure 1:
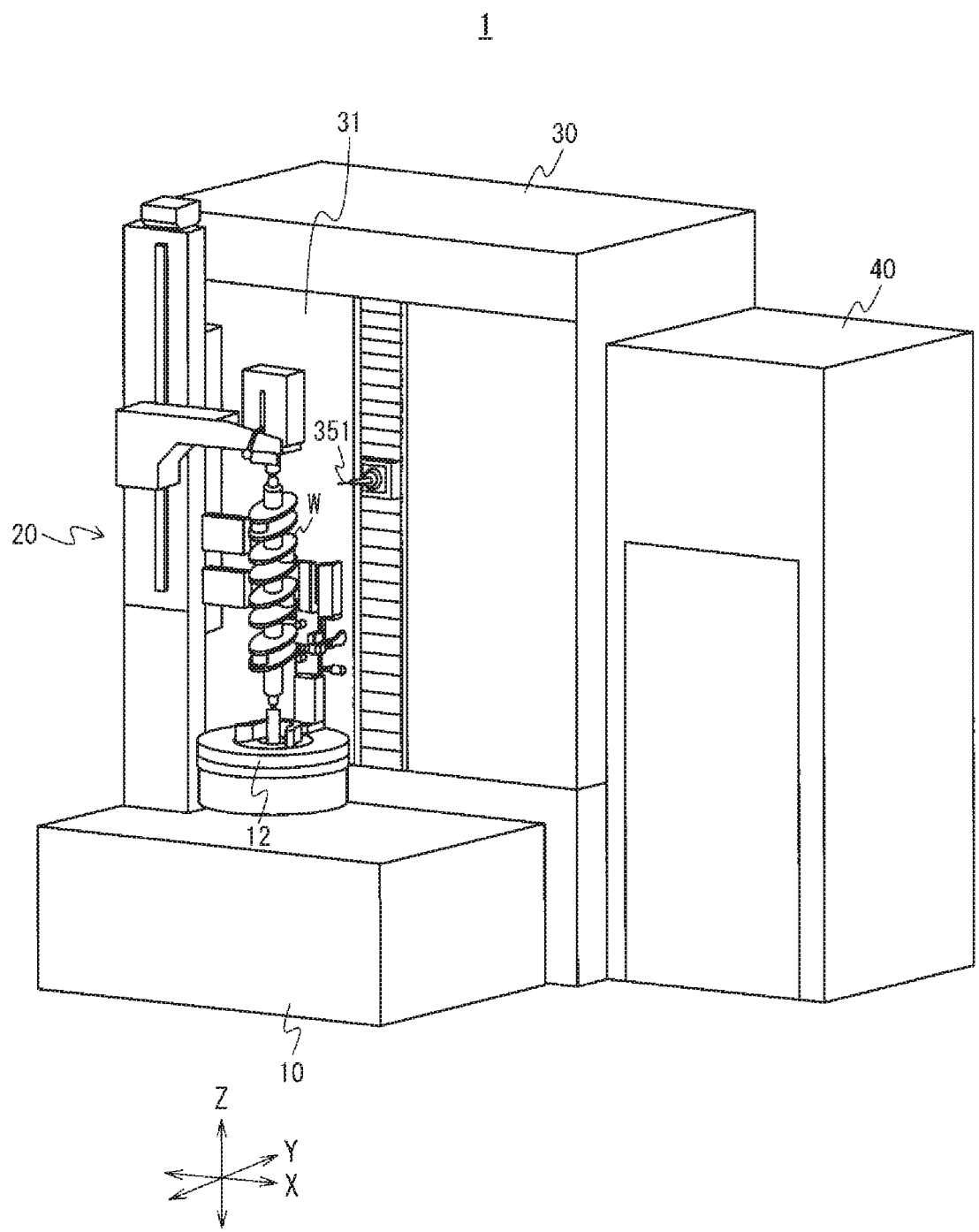
FIG. 1 is a perspective view illustrating an external configuration of a measuring apparatus 1 according to an embodiment of the present invention.
Figure 2:
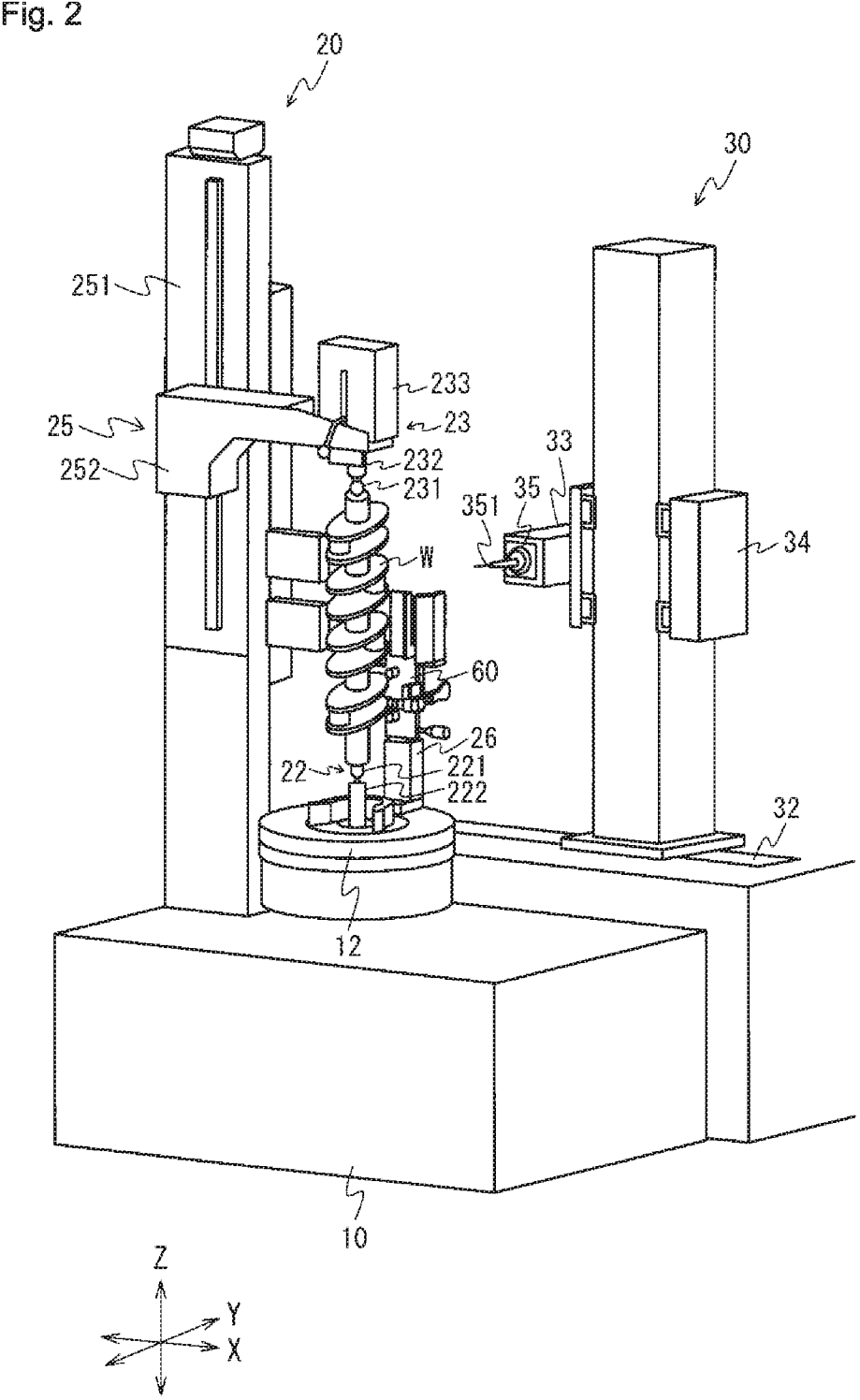
FIG. 2 is a perspective view illustrating a coordinate measuring apparatus 30 with a casing 31 removed and a support mechanism 20.

With reference to FIGS. 1 and 2, a configuration of a measuring apparatus 1 according to a first embodiment of the present invention is described.

FIG. 1 is a perspective view illustrating an external configuration of the measuring apparatus 1 according to the first embodiment. FIG. 2 is a perspective view illustrating a coordinate measuring apparatus 30 (with a casing 31 removed) and a support mechanism 20. As shown in FIG. 1, the measuring apparatus 1 includes a base 10, the support mechanism 20, the coordinate measuring apparatus 30, and a control device 40.

The measuring apparatus 1 measures a columnar work piece W using the coordinate measuring apparatus 30 in a state where the columnar work piece W is supported by the support mechanism 20. When measuring the columnar work piece W, the measuring apparatus 1 performs measurement while displacing a probe 351 of the coordinate measuring apparatus 30 without rotating the columnar work piece W.

The base 10 supports the support mechanism 20 and the coordinate measuring apparatus 30. The base 10 is installed such that, when the measuring apparatus 1 rests on the floor, a top surface is horizontal. A rotary table 12 in a cylindrical shape is provided above the base 10.

The rotary table 12 is driven by a rotation driver (not shown in the drawings) and rotates centered on a rotation shaft in a perpendicular direction (Z-axis direction). In the present embodiment, the rotary table 12 rotates between an attachment/detachment position (illustrated in FIGS. 1 and 2) attaching/detaching the columnar work piece W with respect to the support mechanism 20 and a measurement position (illustrated in FIG. 3) measuring the columnar work piece W using the coordinate measuring apparatus 30.

Figure 3:
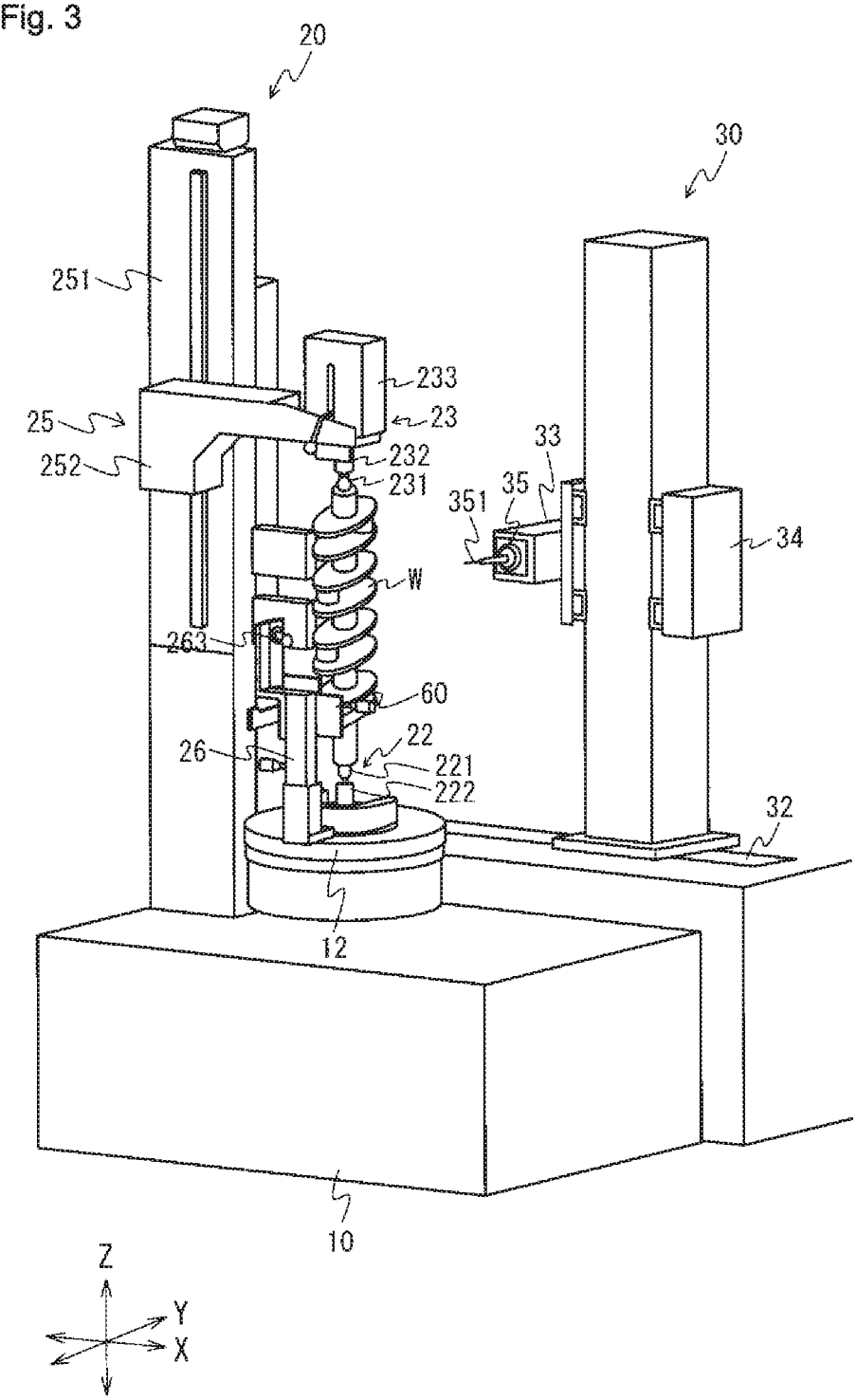
FIG. 3 is a perspective view illustrating the measuring apparatus 1 when a rotary table 12 is positioned at a measurement position.

FIG. 3 is a perspective view illustrating the measuring apparatus 1 when the rotary table 12 is positioned at the measurement position. For ease of illustration, the coordinate measuring apparatus 30 is also illustrated with the casing 31 removed in FIG. 3. As can be seen by comparing FIGS. 1 and 3, the attachment/detachment position of the rotary table 12 is a position where a post portion/post 26 above the rotary table 12 is positioned toward the coordinate measuring apparatus 30, and the measurement position of the rotary table 12 is a position where the post portion 26 stands apart from the coordinate measuring apparatus 30. The measurement position of the rotary table 12 is, for example, a position rotated by 180 degrees from the attachment/detachment position.

Returning to FIG. 1, the support mechanism 20 supports two ends of the columnar work piece W in the axis direction. In the present embodiment, the support mechanism 20 supports the columnar work piece W in a vertically oriented state (state where the axis direction of the columnar work piece W is parallel to the perpendicular direction). In this example, the columnar work piece W is a crank shaft or a cam shaft of a vehicle engine. Further, the support mechanism 20 is described in detail below.

When the rotary table 12 is positioned at the measurement position (FIG. 3), the coordinate measuring apparatus 30 measures the shape and the like of the columnar work piece W supported by the support mechanism 20. The coordinate measuring apparatus 30 is arranged in a lateral direction of the columnar work piece W supported vertically (direction orthogonal to the axis direction of the columnar work piece W). The coordinate measuring apparatus 30 is a lateral coordinate measuring apparatus measuring the shape of the columnar work piece W by bringing the probe 351 close to the columnar work piece W from a lateral direction of the columnar work piece W. As shown in FIG. 2, the coordinate measuring apparatus 30 includes an X-axis driver 32, a Y-axis driver 33, a Z-axis driver 34, and a probe head 35.

The X-axis driver 32 displaces the probe head 35 in an X-axis direction, the Y-axis driver 33 displaces the probe head 35 in a Y-axis direction, and the Z-axis driver 34 displaces the probe head 35 in the Z-axis direction. The X-axis driver 32, Y-axis driver 33, and Z-axis driver 34 are configured by a feed screw mechanism for example. In addition, the X-axis driver 32, Y-axis driver 33, and Z-axis driver 34 are provided inside the casing 31 (FIG. 1).

The probe head 35 is provided to a slider of the Y-axis driver 33. The probe head 35 is displaced in mutually orthogonal three axis directions (X-axis direction, Y-axis direction, and Z-axis direction) by the X-axis driver 32, Y-axis driver 33, and Z-axis driver 34. The probe 351 is attachably/detachably mounted to a tip of the probe head 35.

The probe 351 measures the columnar work piece W while being displaced. In this example, the probe 351 is a contact-type probe performing measurement by contacting the columnar work piece W. The measuring apparatus 1 has the probe 351 in various shapes, and is configured to be capable of switching the probe 351 according to a measurement portion of the columnar work piece W. In addition, the tip of the probe 351 may be configured to allow free movement using the probe head 35.

Returning to FIG. 1, the control device 40 controls an entire operation of the measuring apparatus 1. The control device 40 includes a memory and a controller. The memory includes, for example, ROM (Read Only Memory) and RAM (Random Access Memory). The memory stores a program and various data to be executed by the controller. The controller is a CPU (Central Processing Unit), for example. The controller controls operation of the measuring apparatus 1 by running the program stored in the memory.

For example, the controller controls a rotation of the rotary table 12 and a displacement of the probe head 35.

Detailed Configuration of Support Mechanism 20

With reference to FIGS. 2 and 3, a detailed configuration of the support mechanism 20 supporting the columnar work piece W is described. The support mechanism 20 includes a lower support portion/lower support 22, an upper support portion/upper support 23, a Z direction coarse movement mechanism 25, and the post portion 26. In the present embodiment, the upper support portion 23 corresponds to the first end support portion and the lower support portion 22 corresponds to the second end support portion.

The lower support portion 22 supports the second end of the columnar work piece W in the axis direction (specifically the bottom end portion). The lower support portion 22 is provided centered on the rotation on the rotary table 12 and rotates integrally with the rotary table 12. Therefore, the columnar work piece W supported by the lower support portion 22 also rotates integrally with the rotary table 12. The lower support portion 22 includes a lower supporter 221 and a lower chuck 222.

The lower supporter 221 makes contact with a recess formed on the lower end surface of the columnar work piece W and supports a lower side of the columnar work piece W. The lower supporter 221 is spherical in this example and the center of the lower supporter 221 is positioned on the rotation shaft of the rotary table 12. A shaft is coupled to the lower supporter 221.

The lower chuck 222 is a stick-shaped member and provided on the rotary table 12. A hole is provided in the center of the lower chuck 222 and the shaft of the lower supporter 221 is attachably/detachably inserted through the hole. Accordingly, the lower supporter 221 can be switched in accordance with the columnar work piece W.

The upper support portion 23 supports the first end of the columnar work piece W in the axis direction (specifically, the top end portion). The upper support portion 23, different from the lower support portion 22, does not rotate when the rotary table 12 rotates because a pressing portion/press 233 configuring the upper support portion 23 is fixated to the Z direction coarse movement mechanism 25 as described below. The upper support portion 23 includes an upper supporter 231, an upper chuck 232, and the pressing portion 233.

The upper supporter 231 makes contact with a recess formed on the top end surface of the columnar work piece W and supports an upper side of the columnar work piece W. The upper supporter 231 is spherical in this example. The shaft is coupled to the upper supporter 231.

The upper chuck 232 is a stick-shaped member and fixated to the slider of the pressing portion 233. A hole is provided in the center of the upper chuck 232 and the shaft of the upper supporter 231 is attachably/detachably inserted through the hole.

The pressing portion 233 presses the top end of the columnar work piece W downward. Accordingly, it allows the supported state of the columnar work piece W to be maintained. The pressing portion 233 is fixated to a Z slider 252 of the Z direction coarse movement mechanism 25.

The Z direction coarse movement mechanism 25 is a mechanism displacing the pressing portion 233 in the Z direction. Accordingly, displacement of the pressing portion 233 to a position directly above the columnar work piece W becomes possible. The Z direction coarse movement mechanism 25 includes a Z column 251 and the Z slider 252.

The Z column 251 is supported by the base 10 so as to be parallel to the columnar work piece W, which is supported in the vertical direction. The Z slider 252 is provided so as to be capable of sliding displacement along the Z column 251 in the Z direction.

The post portion 26 is provided to the rotary table 12. The post portion 26 is a block body provided along the perpendicular direction. The first end of the post portion 26 is fixated to the rotary table 12. Therefore, the post portion 26 together with the rotary table 12 rotates between the attachment/detachment position of the rotary table 12 (FIG. 2) and the measurement position (FIG. 3). In the post portion 26, a standard ball 263 (FIG. 3) is provided to perform calibration of the probe 351 prior to measuring the columnar work piece W.

Figure 4:
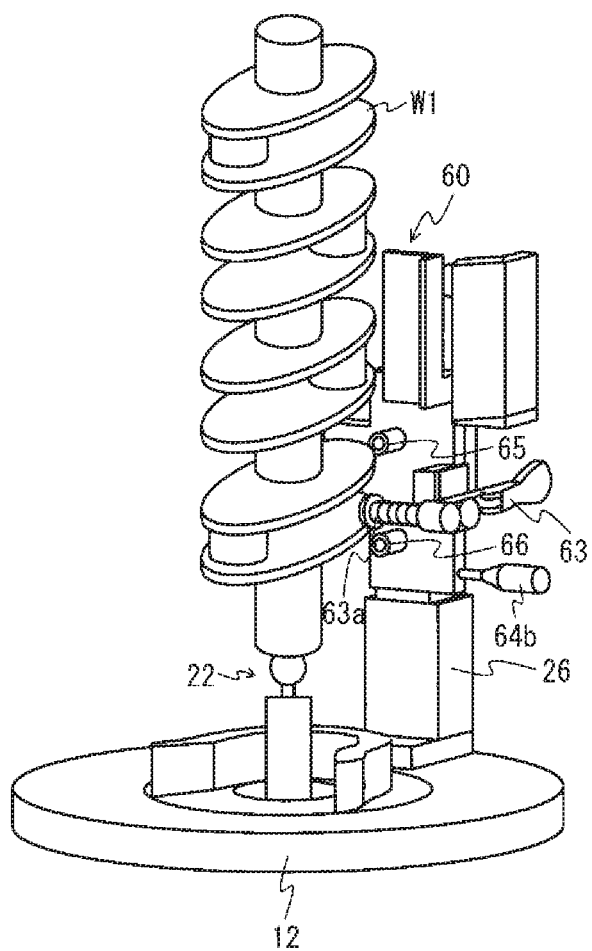
FIG. 4 illustrates a state where a first position determiner 60 is determining a position of a columnar work piece W1.
Figure 5:
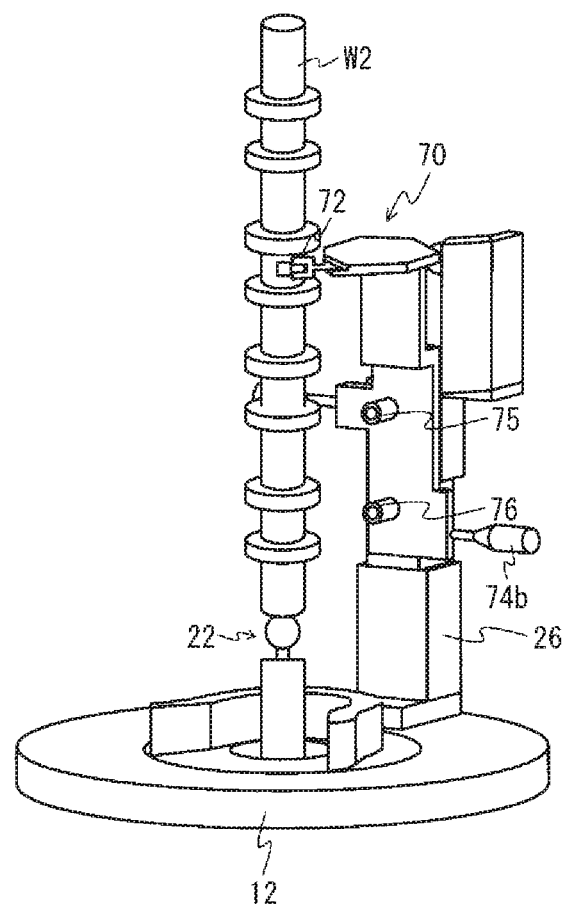
FIG. 5 illustrates a state where a second position determiner 70 is determining a position of a columnar work piece W2.

In the present embodiment, the post portion 26 serves as the mounting portion that mounts the position determiner so as to be switchable, the position determiner determining the position of the columnar work piece W supported by the lower support portion 22 and the upper support portion 23 with respect to the rotary table 12. Specifically, as shown in FIGS. 4 and 5, the first position determiner 60 and the second position determiner 70 are mounted to the post portion 26 so as to be switchable. The first position determiner 60 and the second position determiner 70 determine positions of the work pieces W each having different a shape (specifically, columnar work pieces W1 and W2) with respect to the rotary table 12.

FIG. 4 illustrates a state where the first position determiner 60 is determining the position of the columnar work piece W1. FIG. 5 illustrates a state where the second position determiner 70 is determining the position of the columnar work piece W2. For ease of illustration, the upper support portion 23 of the support mechanism 20 is omitted in FIGS. 4 and 5. Hereafter, the description is given based on an example that the columnar work piece W1 (a first columnar work piece) is a crank shaft of a vehicle engine and the columnar work piece W2 (a second columnar work piece) is a cam shaft.

When supporting the columnar work piece W1 with the support mechanism 20, the first position determiner 60 is mounted to the post portion 26 as shown in FIG. 4. Then, the first position determiner 60 makes contact with the columnar work piece W1 and determines the position of the columnar work piece W1 with respect to the rotary table 12. Accordingly, when the rotary table 12 rotates between the attachment/detachment position and the measurement position, a relative position (phase) of the columnar work piece W1 with respect to the rotary table 12 can be prevented from shifting.

Further, when supporting the columnar work piece W2 with the support mechanism 20, the second position determiner 70 is mounted to the post portion 26 as shown in FIG. 5. Then, the second position determiner 70 makes contact with the columnar work piece W2 and determines the position of the columnar work piece W2 with respect to the rotary table 12. Accordingly, while rotating the rotary table 12, the relative position (phase) of the columnar work piece W2 with respect to the rotary table 12 can be prevented from shifting.

Figure 6:
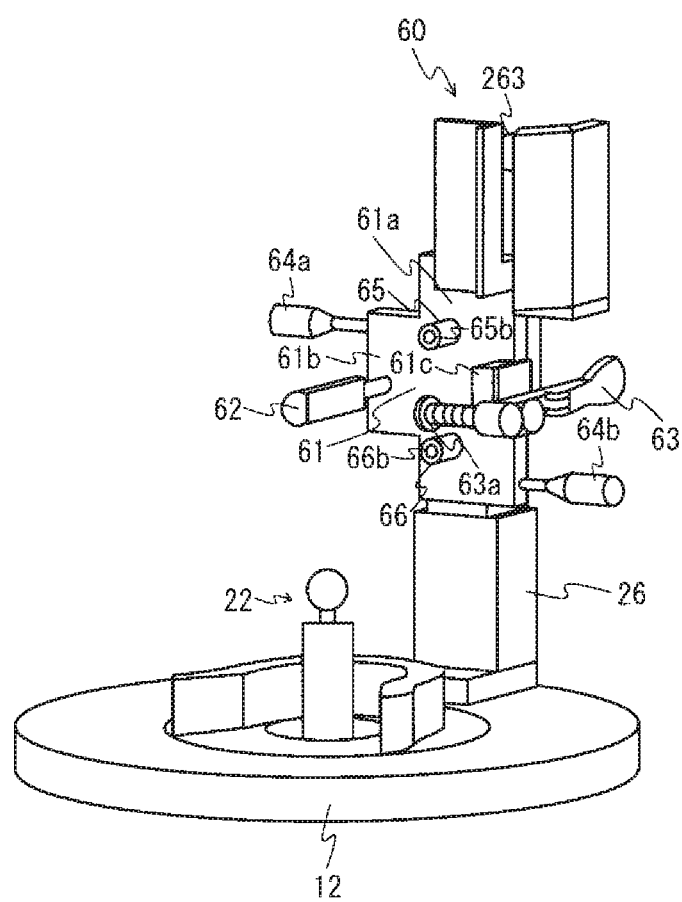
FIG. 6 illustrates a state where the first position determiner 60 is mounted to a post portion 26.
Figure 7:
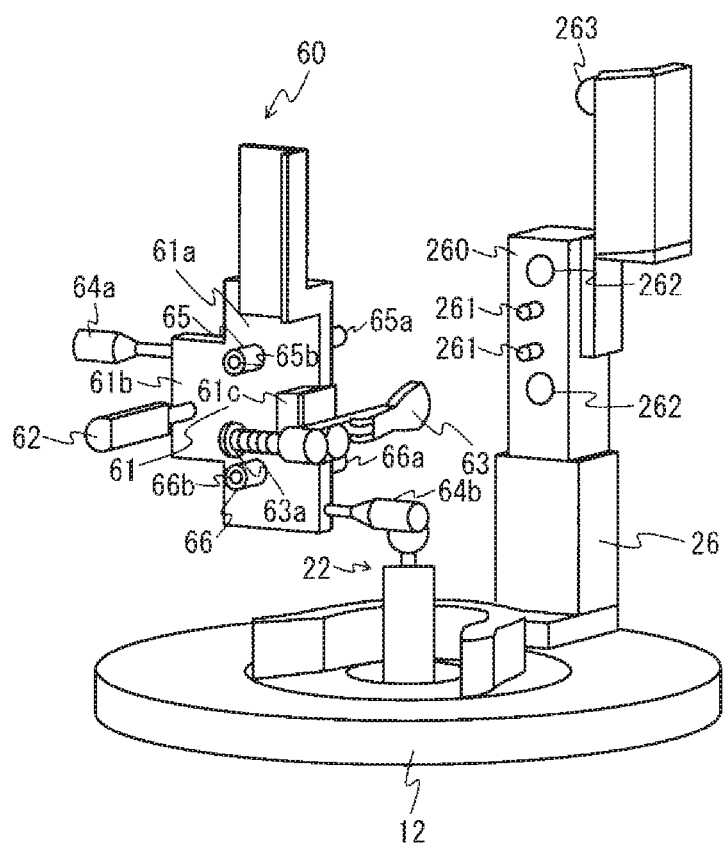
FIG. 7 illustrates a state where the first position determiner 60 is removed from the post portion 26.

Detailed Configuration of First Position Determiner and Second Position Determiner With reference to FIGS. 6 and 7, a detailed configuration is given of the first position determiner 60 being mounted to the post portion 26 so as to be switchable.

FIG. 6 illustrates a state where the first position determiner 60 is mounted to the post portion 26. FIG. 7 illustrates a state where the first position determiner 60 is removed from the post portion 26. The first position determiner 60 includes a base 61, a projection shaft 62, an arm 63, grips 64a, 64b, and operators 65, 66.

The base 61 is a plate-like member and closely contacts a mounting surface 260 of the post portion 26 when the first position determiner 60 is mounted to the post portion 26 as shown in FIG. 6. The base 61 has substantially a "T" shape and is configured with a contact portion 61a closely contacting the mounting surface 260 of the post portion 26 and an extension portion 61b, extending toward a first side surface of the contact portion 61a in a width direction, having a smaller area compared to the contact portion/contact 61a. In addition, a rear surface of the contact portion 61a has guide holes that guide, when mounting the first position determiner 60, guide pins 261 provided to the mounting surface 260 of the post portion 26.

The projection shaft 62 is a shaft portion/shaft projecting from the extension portion/extension 61b of the base 61. The projection shaft 62 is provided on the surface of the extension portion 61b. In addition, the projection shaft 62 is arranged below the center of the extension portion 61b.

The arm 63 includes a clipping portion/clip 63a which clips a crank arm of the crank shaft (columnar work piece W1) together with the projection shaft 62 (see FIG. 4). The arm 63 is attached to an attachment 61c provided on the surface of the contact portion 61a configuring the base 61. The attachment 61c is provided on a second end side of the contact portion 61a in the width direction and is a plate-like member having a predetermined thickness. The arm 63 is attached to the side of the attachment 61c such that the clipping portion 63a can rotate with respect to the projection shaft 62 in approaching and separating directions. Accordingly, the position of the columnar work piece W1 can be determined with respect to the rotary table 12. In addition, even when the width of the crank arm is different for each columnar work piece W1 being mounted, the columnar work piece W1 can be clipped by rotating the arm 63 according to the width.

The grips 64a and 64b are provided at a different height respectively on both sides of the base 61 in the width direction. The grips 64a and 64b are portions gripped by both hands of a worker when the worker (measurer) mounts or removes the first position determiner 60 with respect to the post portion 26. In other words, the worker grips the grip 64a with one hand and the grip 64b with other hand. Furthermore, in the present embodiment, a pair of grips 64a and 64b is provided, but the number is not limited to this and may have a single grip.

The operators 65 and 66 are shaft-shaped members with which the worker performs attachment and detachment of the first position determiner 60 with respect to the post portion 26. The operators 65 and 66 are provided at positions where the worker can operate with fingers while gripping the grips 64a and 64b. Specifically, the operators 65 and 66 are provided toward the center of the base 61 so as to be aligned in the perpendicular direction. Accordingly, the worker can hold and operate the first position determiner 60 simultaneously, and thus improving operability of the first position determiner 60 attaching/detaching to/from the post portion 26. In addition, operating two operators 65 and 66 can be performed simultaneously.

As shown in FIG. 7, the operators 65 and 66 include engagement shafts 65a, 66a and push buttons 65b, 66b respectively. The engagement shafts 65a and 66a are shaft members projecting from the rear side of the base 61. When the first position determiner 60 is mounted to the post portion 26, the engagement shafts 65a and 66a are engaged respectively to two holes 262 provided to the mounting surface 260 of the post portion 26 so as to be aligned in the perpendicular direction (see FIG. 7). Further, the engagement shafts 65a and 66a have clamp portions clamping (fixating) the base 61 and the post portion 26 in a state in which the engagement shafts 65a and 66a are engaged with the holes 262. Accordingly, the first position determiner 60 mounted to the post portion 26 can be prevented from accidentally becoming detached.

In addition, the engagement shafts 65a and 66a, by fitting respectively with the holes 262, are able to determine the position of the first position determiner 60 with respect to the post portion 26. Accordingly, when fixating the first position determiner 60 to the post portion 26, the position can be determined automatically. As noted above, the operators 65 and 66 are able to determine the position of the first position determiner 60 at a predetermined position of the post portion 26 in addition to being able to fixate the first position determiner 60 to the post portion 26. Therefore, it becomes possible to reduce the number of components.

The push buttons 65b and 66b are pushed by the worker when the first position determiner 60 is attached/detached to/from the post portion 26. Specifically, after the worker engages the engagement shaft 65a to the hole 262 while pushing the push buttons 65b and 66b, the base 61 is clamped to the post portion 26 when the worker releases the push buttons 65b and 66b.

In addition, when the base 61 is clamped to the post portion 26, the worker can remove the first position determiner 60 from the post portion 26 by displacing the first position determiner 60 while pushing the push buttons 65b and 66b again. In this way, operability of the operators 65 and 66 are improved because the pushing operation of the push buttons 65b and 66b when mounting the first position determiner 60 to the post portion 26 is the same as the pushing operation of the push buttons 65b and 66b when removing the first position determiner 60 from the post portion 26.

Figure 8:
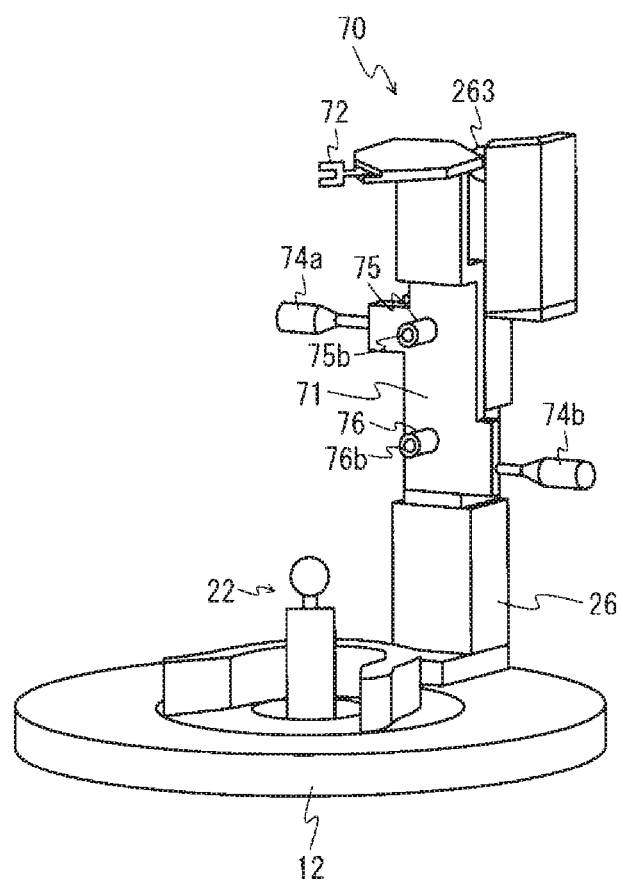
FIG. 8 illustrates a state where the second position determiner 70 is mounted to the post portion 26.
Figure 9:
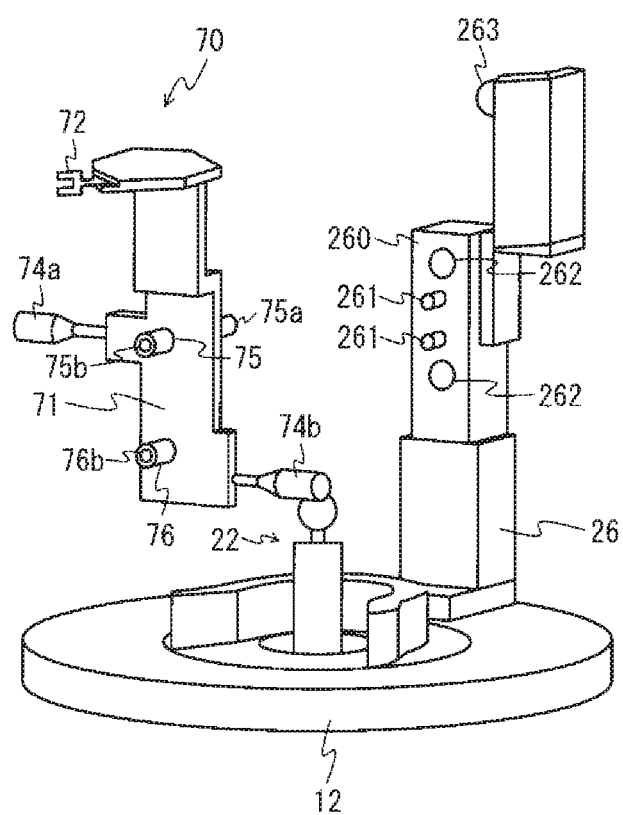
FIG. 9 illustrates a state where the second position determiner 70 is removed from the post portion 26.

With reference to FIGS. 8 and 9, a detailed configuration is given of the second position determiner 70 being mounted to the post portion 26 so as to be switchable. FIG. 8 illustrates a state where the second position determiner 70 is mounted to the post portion 26. FIG. 9 illustrates a state where the second position determiner 70 is removed from the post portion 26. The second position determiner 70 includes a base 71, an abutting portion/abutment 72, grips 74a, 74b, and operators 75, 76.

The base 71 is a plate-like member. The base 71 has the different shape from the base 61 of the first position determiner 60. The base 71 closely contacts the mounting surface 260 of the post portion 26 when the second position determiner 70 is mounted to the post portion 26 as shown in FIG. 8. In addition, the base 71 is provided with guide holes guided by the guide pins 261 of the post portion 26 when mounting the second position determiner 70.

The abutting portion 72 is a portion contacting a reference portion of a cam shaft W2 (columnar work piece W2). Accordingly, the position of the columnar work piece W2 can be determined with respect to the rotary table 12. The abutting portion 72 is coupled to the top portion of the base 71. In this way, the abutting portion 72 contacts the center of the columnar work piece W2 in the axis direction.

The grips 74a and 74b, similar to the grips 64a and 64b of the first position determiner 60, are the portions where the worker grips using both hands when the worker mounts or removes the second position determiner 70 with respect to the post portion 26.

The operators 75 and 76, similar to the operators 65 and 66 of the first position determiner 60, are the shaft-shaped members operated by the worker who performs attachment and detachment of the second position determiner 70 with respect to the post portion 26. In the state where the worker grips the grips 74a and 74b in both hands, the operators 75 and 76 can be operated using the fingers of both hands. The operators 75 and 76 include an engagement shaft 75a and push buttons 75b, 76b. The configuration of the engagement shaft 75a and the push buttons 75b, 76b is the same as the configuration of the engagement shaft 65a of the first position determiner 60 and the push buttons 65b, 66b respectively, and thus the detailed description is omitted.

Switching Flow of First Position Determiner and Second Position Determiner

An switching operation of the first position determiner 60 and the second position determiner 70 is described. In this example, the operation flow is described from time when the first position determiner 60 is removed from the post portion 26 to the time when the second position determiner 70 is mounted to the post portion 26.

First, after measuring the columnar work piece W1, the worker removes the first position determiner 60 mounted to the post portion 26 as shown in FIG. 6. Specifically, the worker displaces the first position determiner 60 frontward while pushing the push buttons 65b and 66b respectively with the fingers of both hands in a state where the worker is gripping the grips 64a and 64b of the first position determiner 60 in both hands. Accordingly, as shown in FIG. 7, the first position determiner 60 is removed from the post portion 26.

Next, the worker mounts the post portion 26 to the second position determiner 70. Specifically, the worker brings the second position determiner 70 closer to the post portion 26 while gripping the grips 74a and 74b of the second position determiner 70 in both hands. Then, the worker engages the engagement shaft 65a to a hole 262 while pushing the push buttons 75b and 76b respectively with the fingers of both hands in a state where the worker gripping the grips 74a and 74b in both hands. After that, the worker releases the fingers from the push buttons 75b, 76b and the second position determiner 70 is clamped to the post portion 26. Accordingly, the second position determiner 70 is mounted to the post portion 26.

Further, the operation flow of the second position determiner 70 being removed from the post portion 26 and the first position determiner 60 being mounted to the post portion 26 is the same.

EFFECTS OF THIS EMBODIMENT

In the measuring apparatus 1 noted above, the first position determiner 60 and the second position determiner 70 are mounted to the post portion 26 so as to be switchable. The first position determiner 60 determines the position of the columnar work piece W1 (crank shaft, for example) with respect to the rotary table 12. The second position determiner 70 determines position of the columnar work piece W2 (cam shaft, for example) with respect to the rotary table 12. In this way, by simply switching between the first position determiner 60 and the second position determiner 70, two kinds of the columnar work pieces W1 and W2 respectively can be supported by the support mechanism 20, and therefore the columnar work pieces W1 and W2 can be measured with one measuring apparatus 1. For example, when the measuring apparatus 1 is damaged or the like in the manufacturing line measuring the columnar work piece W1, the columnar work piece W1 can be measured using the measuring apparatus 1 which measures the columnar work piece W2, and therefore the productivity is improved.

In the above, a configuration is described where the post portion 26 is fixated to the rotary table 12 in advance and the first position determiner 60 and the second position determiner 70 are switchably mounted to the post portion 26. However, the configuration is not limited to this. For example, the first position determiner 60 and the second position determiner 70 may individually be formed integrally with the post portion 26 and may be switchably mounted to the rotary table 12 together with the post portion 26.

Further, in the above, a configuration is described where the two position determiners (first position determiner 60 and the second position determiner 70) corresponding to the two columnar work pieces W (columnar work pieces W1 and W2) are switchably mounted to the post portion 26. However, the configuration is not limited to this. For example, at least three position determiners may be switchably mounted to the post portion 26.

Furthermore, in the above description, a configuration is described where the support mechanism 20 supports the columnar work piece W in the vertical direction. However, the configuration is not limited to this. For example, the support mechanism 20 can support the columnar work piece W in a lateral direction.

In addition, in the above description, the probe 351 is a contact-type probe performing measurement by contacting the columnar work piece W. However, the configuration is not limited to this. For example, the probe 351 may be a non-contact-type probe performing measurement without contacting the columnar work piece W.

Further, in the above description, the columnar work piece W is the crank shaft or the cam shaft of the vehicle engine. However, the present invention is not limited to this and other columnar work pieces may be used.

As mentioned above, the embodiment of the present invention is described. However, the technical scope of the present invention is not limited to the scope noted in the embodiment above. It is apparent to those skilled in the art that various modifications and improvements can be added in the above embodiment. Such modifications and improvements are included in the technical scope of the present invention as it is apparent from the description of the scope of claims.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measuring apparatus comprising:
a first end support that supports a first end of one of a first columnar work piece and a second columnar work piece in an axis direction;
a second end support that supports a second end of the one of the first and second columnar work pieces in the axis direction;
a probe that measures a dimension of the one of the first and second columnar work pieces supported by the first end support and the second end support;
a rotary table coupled to the second end support and capable of rotating centered in the axis direction;
a mount provided to the rotary table;
a first configuration wherein the mount accepts a first position determination assembly, wherein the first position determination assembly determines, with respect to the rotary table, a position of a first columnar work piece having a first shape; and
a second configuration wherein the mount accepts a second position determination assembly, wherein the second position determination assembly determines, with respect to the rotary table, a position of a second columnar work piece having a second shape different from the first shape;
wherein:
the first position determination assembly in the first configuration and the second position determination assembly in the second configuration are each removably connectable, one at a time, to the mount,
when the first columnar work piece is supported by the first end support and the second end support, the first position determination assembly is removably connected to the mount to determine the position of the first columnar work piece by contacting the first columnar work piece, and
when the second columnar work piece is supported by the first end support and the second end support, the second position determination assembly is removably connected to the mount to determine the position of the second columnar work piece by contacting the second columnar work piece.

2. The measuring apparatus according to claim 1, further comprising, in the first position determination assembly and the second position determination assembly, one or more shafts that perform attachment/detachment with respect to the mount.

3. The measuring apparatus according to claim 2, wherein the one or more shafts are fitted to an aperture provided to the mount.

4. The measuring apparatus according to claim 2, further comprising a grip provided to the first position determination assembly and the second position determination assembly.

5. The measuring apparatus according to claim 3, further comprising a grip provided to the first position determination assembly and the second position determination assembly.

6. The measuring apparatus according to claim 4, wherein:
the grip is respectively provided on both side surfaces of the first position determination assembly and the second position determination assembly, and
the one or more shafts include two shafts respectively provided on a central area of the first position determination assembly and the second position determination assembly.

7. The measuring apparatus according to claim 5, wherein:
the grip is respectively provided on both side surfaces of the first position determination assembly and the second position determination assembly, and
the one or more shafts include two shafts respectively provided on a central area of the first position determination assembly and the second position determination assembly.

8. The measuring apparatus according to claim 1, wherein at least one of the first and second columnar work pieces is a camshaft.

9. The measuring apparatus according to claim 1, wherein at least one of the first and second columnar work pieces is a crankshaft.

10. A support mechanism of a columnar work piece, comprising:
a first end support that supports a first end of one of a first columnar work piece and a second columnar work piece in an axis direction;
a second end support that supports a second end of the one of the first and second columnar work pieces in the axis direction;
a rotary table coupled to the second end support and being rotatable centered in the axis direction;
a mount provided to the rotary table;
a first configuration wherein the mount accepts a first position determination assembly that determines, with respect to the rotary table, a position of a first columnar work piece having a first shape; and
a second configuration wherein the mount accepts a second position determination assembly that determines, with respect to the rotary table, a position of a second columnar work piece having a second shape different than the first shape;
wherein:
the first position determination assembly in the first configuration and the second position determination assembly in the second configuration are each removably connectable, one at a time, to the mount,
when the first columnar work piece is supported by the first end support and the second end support, the first position determination assembly is removably connected to the mount to determine the position of the first columnar work piece by contacting the first columnar work piece, and
when the second columnar work piece is supported by the first end support and the second end support, the second position determination assembly is removably connected to the mount to determine the position of the second columnar work piece by contacting the second columnar work piece.

* * * * *